T. J. SCOTT.
PIPE CONNECTION.
APPLICATION FILED MAR. 18, 1914.
1,147,755.
Patented July 27, 1915.
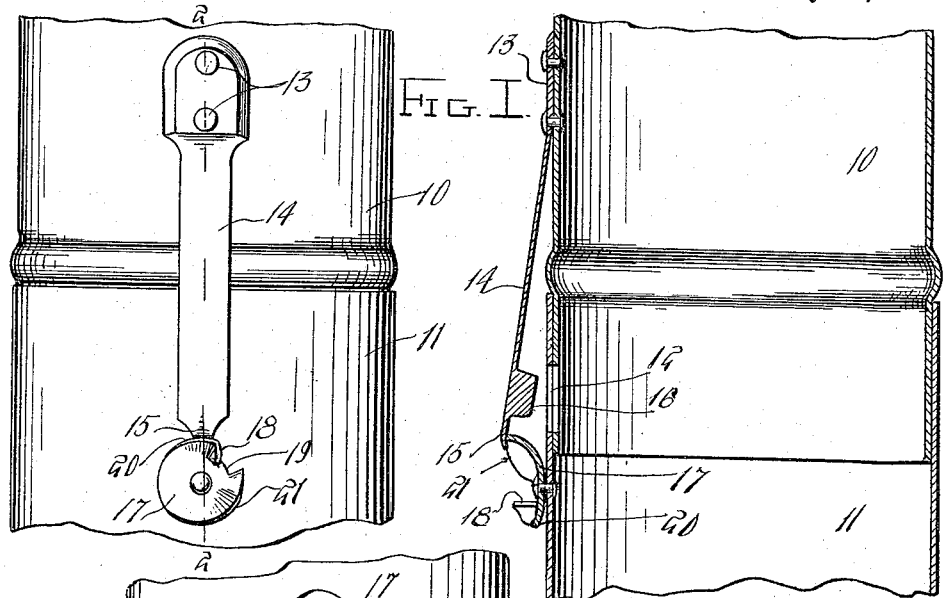
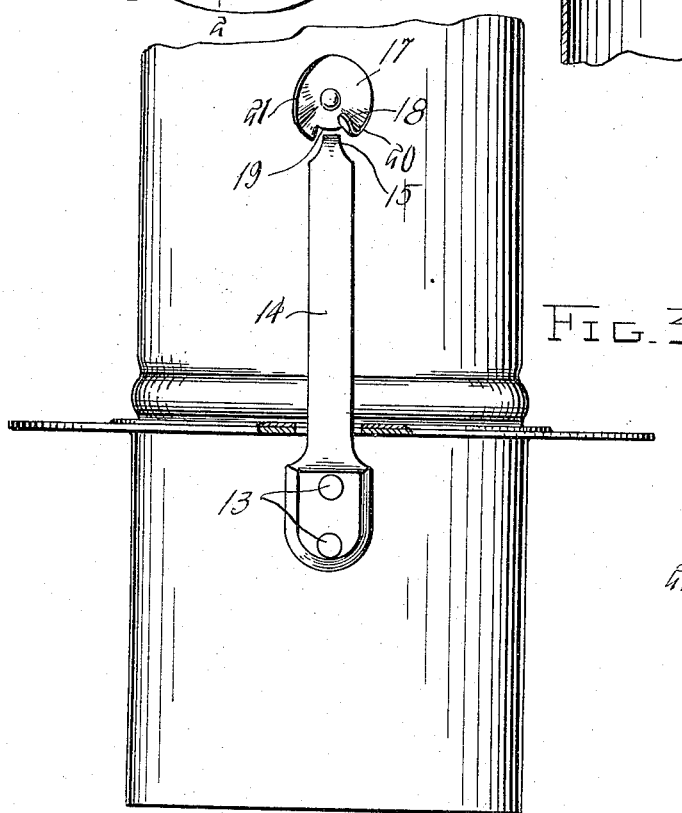
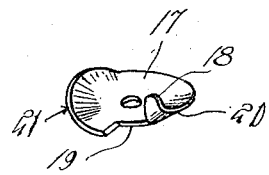
Witnesses
Inventor
T. J. Scott
By Chandlee Chandlee
Attorney

UNITED STATES PATENT OFFICE.

THOMAS J. SCOTT, OF MARSHFIELD, OREGON.

PIPE CONNECTION.

1,147,755.  Specification of Letters Patent.  Patented July 27, 1915.

Application filed March 18, 1914. Serial No. 825,677.

*To all whom it may concern:*

Be it known that I, THOMAS J. SCOTT, a citizen of the United States, residing at Marshfield, in the county of Coos, State of Oregon, have invented certain new and useful Improvements in Pipe Connections; and I do hereby declare the following to be a full, clear, and exact description of the invention, such as will enable others skilled in the art to which it appertains to make and use the same.

This invention relates to improvements in pipe connections in which a simple and efficient form of fastening means is provided whereby sections of pipe may be securely connected together and positively held against displacement.

A further object resides in the provision of a novel keeper element, the rotation of which in one direction serves to retain the latch element in locked position with the pipe sections, and rotation in the opposite direction to release the latch element from locked engagement with the pipe sections and permit the disconnection thereof.

A still further object of the invention resides in the provision of a strong and durable fastening means of the above character, that may be manufactured at comparatively low cost and quickly operated to place the sections of pipe in locked or unlocked relation.

With these and other objects of similar nature in view, the invention consists in the construction, combination and arrangement of parts set forth and falling within the scope of the appended claim.

In the accompanying drawing forming part of this specification:—

Figure 1 is a view of two sections of stove pipe with the device applied thereto and the parts shown in their locked position, Fig. 2 is a sectional view on the line 2—2 of Fig. 1, with the parts shown in their released position, Fig. 3 is a view of a stove pipe and thimble, with the device applied thereto and the keper in its neutral position, and Fig. 4 is a perspective view of the keeper removed from the pipe.

Referring now to the drawing in which like characters of reference designate similar parts, the numerals 10 and 11 designate two sections of stove pipe of the usual construction, the adjacent ends of which are each provided with an opening 12, adapted to register when the sections are in their telescopic position.

Arranged longitudinally upon the pipe section 10, and secured thereto by rivets 13 or other suitable fastening means, is a latch member 14, said latch being formed preferably of spring steel and provided at its free end with a reduced portion 15. The latch 14 is further provided adjacent the reduced portion 15, with a right angular projection or lug 16, said projection being adapted to pass within the openings 12 of the sections 10 and 11 to lock said sections in interfitting relation.

Rotatably mounted on the pipe section 11 is a keeper disk 17, said disk being disposed in such position with respect to the latch 14, as to engage the reduced portion 15 thereof, and upon rotation in one direction to lock the lug 16 in the openings 12, and rotation in the opposite direction to withdraw the lug 16 from the openings and permit of disconnection of the pipe sections. This disk is preferably stamped from a single blank of metal and has struck up therefrom a finger piece 18, said piece forming the means whereby the disk may be rotated. The disk 17 is also formed with a notch 19 through which the reduced portion of the latch 14 is adapted to pass to its locked or unlocked position, and is further provided adjacent said notched portion with a cam surface 20 and a cam edge 21, the former being engageable with the upper face of the reduced portion 15 to retain the lug 16 in the openings 12, and the latter engageable with the under face of said reduced portion to withdraw the lug 16 from said openings.

The construction of the device shown in Fig. 3 of the drawings is similar to that of Fig. 1, the elements being shown as connecting a stove pipe and thimble instead of two sections of pipe and the keeper in its neutral position to permit the withdrawal of the lug 16 by means other than the rotation of the keeper.

From the foregoing it will be apparent that I have provided a simple, strong, and inexpensive fastening means of the character described, and one in which novel means have been employed to retain the lug 16 in its locking position and to withdraw said lug from the pipe sections to permit the disconnection thereof.

What is claimed, is:—

In a pipe connection, the combination with a pair of telescopic pipe sections each having a registering opening therein, of a latch member carried by one of the sections and having a lug inserted through said openings and a keeper rotatably mounted on the other pipe section, said keeper comprising a disk having a notch therein and oppositely arranged cam faces adjacent said notch and engageable with the latch, whereby rotation of the keeper in one direction serves to retain the lug within the openings and rotation in the opposite direction to withdraw said lug and permit of disconnection of said pipe sections.

In testimony whereof, I affix my signature, in the presence of two witnesses.

THOMAS J. SCOTT.

Witnesses:
　HORACE M. ALBEE,
　J. A. ENSINMINGER.

Copies of this patent may be obtained for five cents each, by addressing the "Commissioner of Patents, Washington, D. C."